US012723515B2

(12) United States Patent
Campbell et al.

(10) Patent No.: US 12,723,515 B2
(45) Date of Patent: Sep. 1, 2026

(54) METHOD OF FORMING LOAD BEARING INSERT AND INSERT FOR CERAMIC MATRIX COMPOSITE TURBINE COMPONENTS

(71) Applicant: RTX Corporation, Farmington, CT (US)

(72) Inventors: Christian X. Campbell, West Hartford, CT (US); Rutva A. Patel, Middletown, CT (US); Justin C. Pratt, Marlborough, CT (US); Joshua Ramer, Auburn, AL (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/428,838

(22) Filed: Jan. 31, 2024

(65) Prior Publication Data

US 2025/0243767 A1 Jul. 31, 2025

(51) Int. Cl.
*F01D 5/28* (2006.01)
*B28B 23/02* (2006.01)

(52) U.S. Cl.
CPC .............. *F01D 5/282* (2013.01); *B28B 23/02* (2013.01); *F01D 5/284* (2013.01); *F05D 2300/6033* (2013.01)

(58) Field of Classification Search
None
See application file for complete search history.

(56) References Cited

U.S. PATENT DOCUMENTS

| | | | |
|---|---|---|---|
| 3,619,077 A | 11/1971 | Wile et al. | |
| 5,789,061 A | 8/1998 | Campbell et al. | |
| 6,024,898 A * | 2/2000 | Steibel | C04B 35/62884 264/29.7 |
| 6,164,903 A | 12/2000 | Kouris | |
| 6,884,030 B2 | 4/2005 | Darkins, Jr. et al. | |
| 8,251,652 B2 | 8/2012 | Campbell et al. | |
| 8,672,609 B2 | 3/2014 | Lussier et al. | |

(Continued)

FOREIGN PATENT DOCUMENTS

| | | |
|---|---|---|
| CA | 2935369 A1 | 1/2017 |
| CN | 106014494 B | 8/2018 |

(Continued)

OTHER PUBLICATIONS

European Search Report for EP Application No. 25155409.3 dated Jul. 8, 2025.

(Continued)

*Primary Examiner* — Christopher T Schatz
(74) *Attorney, Agent, or Firm* — Carlson, Gaskey & Olds, P.C.

(57) ABSTRACT

A method of forming a gas turbine engine component includes the steps of forming a component shape from a plurality of fabric layers of ceramic matrix composite. The component has an outer surface. An insert is formed from a plurality of fabric layers of ceramic matrix composites into a cup-shaped intermediate insert. The intermediate insert member is densified. Then a final insert is inserted between radially outer layers and radially inner layers on the outer surface. The method then densifies the component. A gas turbine engine component and a gas turbine engine are also disclosed.

14 Claims, 7 Drawing Sheets

(56) References Cited

U.S. PATENT DOCUMENTS

| | | | |
|---|---|---|---|
| 8,734,605 | B2 | 5/2014 | Harrison |
| 8,888,451 | B2 | 11/2014 | Falk et al. |
| 8,905,711 | B2 | 12/2014 | Suciu et al. |
| 9,005,382 | B2 | 4/2015 | Steibel et al. |
| 9,664,053 | B2 | 5/2017 | Marshall et al. |
| 9,752,445 | B2 | 9/2017 | Watanabe |
| 10,329,950 | B2 | 6/2019 | Freeman et al. |
| 10,589,474 | B2 | 3/2020 | Tsai et al. |
| 10,724,387 | B2 | 7/2020 | Farrar et al. |
| 10,737,449 | B2 | 8/2020 | Bernetich et al. |
| 11,465,731 | B2 | 10/2022 | Douglas |
| 11,519,280 | B1 | 12/2022 | Bainbridge et al. |
| 11,560,799 | B1 | 1/2023 | Harris et al. |
| 11,773,735 | B2 | 10/2023 | Whittle et al. |
| 11,773,751 | B1 | 10/2023 | Freeman et al. |
| 12,006,842 | B1 | 6/2024 | Kim et al. |
| 2005/0076504 | A1 | 4/2005 | A. Morrison et al. |
| 2007/0237630 | A1 | 10/2007 | Schiavo, Jr. et al. |
| 2008/0203236 | A1 | 8/2008 | Mazzola et al. |
| 2010/0054932 | A1 | 3/2010 | Schiavo |
| 2011/0008156 | A1 | 1/2011 | Prentice et al. |
| 2013/0052030 | A1 | 2/2013 | Mccaffrey |
| 2013/0180642 | A1 | 7/2013 | Blot et al. |
| 2015/0044054 | A1* | 2/2015 | Loftus .................. F01D 5/3007 29/889.71 |
| 2017/0298748 | A1 | 10/2017 | Vetters et al. |
| 2018/0051581 | A1 | 2/2018 | Quennehen et al. |
| 2018/0179906 | A1 | 6/2018 | Schetzel et al. |
| 2020/0232332 | A1 | 7/2020 | Farrar et al. |
| 2020/0362709 | A1 | 11/2020 | Whittle |
| 2021/0140341 | A1 | 5/2021 | Generale et al. |
| 2023/0191746 | A1 | 6/2023 | Gimat et al. |
| 2023/0193527 | A1 | 6/2023 | Read |

FOREIGN PATENT DOCUMENTS

| | | | |
|---|---|---|---|
| CN | 110529195 | B | 6/2022 |
| EP | 3613951 | A1 | 2/2020 |
| EP | 3971391 | A2 | 3/2022 |
| EP | 4006307 | A2 | 6/2022 |
| EP | 4283096 | A1 | 11/2023 |
| WO | 2014/128418 | A1 | 8/2014 |

OTHER PUBLICATIONS

European Search Report for EP Application No. 25155105.7 dated Jul. 1, 2025.

* cited by examiner

METHOD OF FORMING LOAD BEARING INSERT AND INSERT FOR CERAMIC MATRIX COMPOSITE TURBINE COMPONENTS

BACKGROUND OF THE INVENTION

This application relates to a method of forming a turbine component of ceramic matrix composites ("CMCs") wherein a load bearing insert is placed on an upper platform. A load bearing hat feature that is formed by said insert is also disclosed.

Gas turbine engines are known, and typically include a propulsor delivering air into a compressor section where it is mixed with fuel and ignited. The propulsor also delivers air for propulsion outwardly of the compressor section. From the compressor the air is delivered into a combustor where it is mixed with fuel and ignited. Products of this combustion pass downstream over turbine rotors, driving them to rotate. The turbine rotors in turn drive the compressor rotor and the propulsor rotor.

It is known that the hot products of combustion raise challenges for components in the turbine section. Thus, it has been proposed to utilize CMCs to form the components, as that material is more resistant to temperature. However, the use of CMCs raises challenges.

SUMMARY OF THE INVENTION

In a featured embodiment, a method of forming a gas turbine engine component includes the steps of forming a component shape from a plurality of fabric layers of ceramic matrix composite. The component has an outer surface. An insert is formed from a plurality of fabric layers of ceramic matrix composites into a cup-shaped intermediate insert. The intermediate insert member is densified. Then a final insert is inserted between radially outer layers and radially inner layers on the outer surface. The method then densifies the component.

In another embodiment according to the previous embodiment, further includes the step of cutting ends of the intermediate insert away to form the final insert.

In another embodiment according to any of the previous embodiments, there are at least two of the final insert cut away from the intermediate.

In another embodiment according to any of the previous embodiments, after the ends are cut away from the intermediate insert a hollow that defines the cup-shape of the intermediate insert remains.

In another embodiment according to any of the previous embodiments, the intermediate insert is formed from a plurality of cup-shaped stacks and then assembling the plurality of stacks to form the intermediate insert.

In another embodiment according to any of the previous embodiments, the plurality of cup-shaped stacks are each formed of a plurality of layers compressed together.

In another embodiment according to any of the previous embodiments, all of the plurality of cup-shaped stacks are compressed together at one time.

In another embodiment according to any of the previous embodiments, at least two sub-assemblies of the cup-shaped stacks are compressed together, and then the at least two sub-assemblies of the cup-shaped stacks are then brought together to be compressed together in another compression step.

In another embodiment according to any of the previous embodiments, the cup-shaped stacks are each formed of a plurality of layers.

In another embodiment according to any of the previous embodiments, the gas turbine engine component is a vane.

In another embodiment according to any of the previous embodiments, the plurality of ceramic matrix composite layers forming the intermediate insert are cut at the same time.

In another embodiment according to any of the previous embodiments, the final insert has an endface to provide a reaction surface against a mount member.

In another embodiment according to any of the previous embodiments, the plurality of layers of ceramic matrix composite are initially planar, but when formed into the cup-shaped intermediate insert, the originally planar layers have ends which are bent relative to a central portion to form an arch-shape.

In another embodiment according to any of the previous embodiments, the final insert is mounted onto a planar inner surface in the component.

In another embodiment according to any of the previous embodiments, the ends of the final insert have fibers extending in a direction which has at least a component normal to a planar surface of the inner surface.

In another featured embodiment, a gas turbine engine component includes an inner surface and an outer surface. The outer surface and the inner surface are formed of ceramic matrix composite fabric layers, and the outer surface has a mount location and a mount member. The mount member is in contact with an insert that is inserted within outer layers of the outer surface to form a thickened portion having an end surface that will react against forces from the mount member. The insert also is formed of a plurality of ceramic matrix composite fabric layers. The ceramic matrix composite fiber layers have an arch-shape such that the fabric layers have ends which are bent relative to a central portion, and such that ends have at least a component in a direction normal to a planar surface of inner layers of the outer surface.

In another embodiment according to any of the previous embodiments, the component is a vane having an airfoil and inner and outer platforms, and the insert being on one of the inner and outer platforms.

In another embodiment according to any of the previous embodiments, the insert being on the outer platform.

In another featured embodiment, a gas turbine engine includes a compressor section, a combustor and a turbine section. The turbine section includes rotating turbine blades and at least one stationary component mounted adjacent a rotating turbine blade. The stationary component has an inner surface and an outer surface. The outer surface and the inner surface are formed of ceramic matrix composite layers, and the outer surface has a mount location and a mount member. The mount member is in contact with an insert that is inserted within outer layers of the outer surface to form a thickened portion having an end surface that will react against forces from the mount member. The insert also is formed of a plurality of ceramic matrix composite fabric layers. The insert ceramic matrix composite fiber layers have an arch-shape such that the fabric layers have ends which are bent relative to a central portion, and such that ends have at least a component in a direction normal to a planar surface of inner layers of the outer surface.

In another embodiment according to any of the previous embodiments, the component is a vane having an airfoil and inner and outer platforms, and the insert being on one of the inner and outer platforms.

The present disclosure may include any one or more of the individual features disclosed above and/or below alone or in any combination thereof.

These and other features of the present invention can be best understood from the following specification and drawings, the following of which is a brief description.

DETAILED DESCRIPTION

Figure 1:
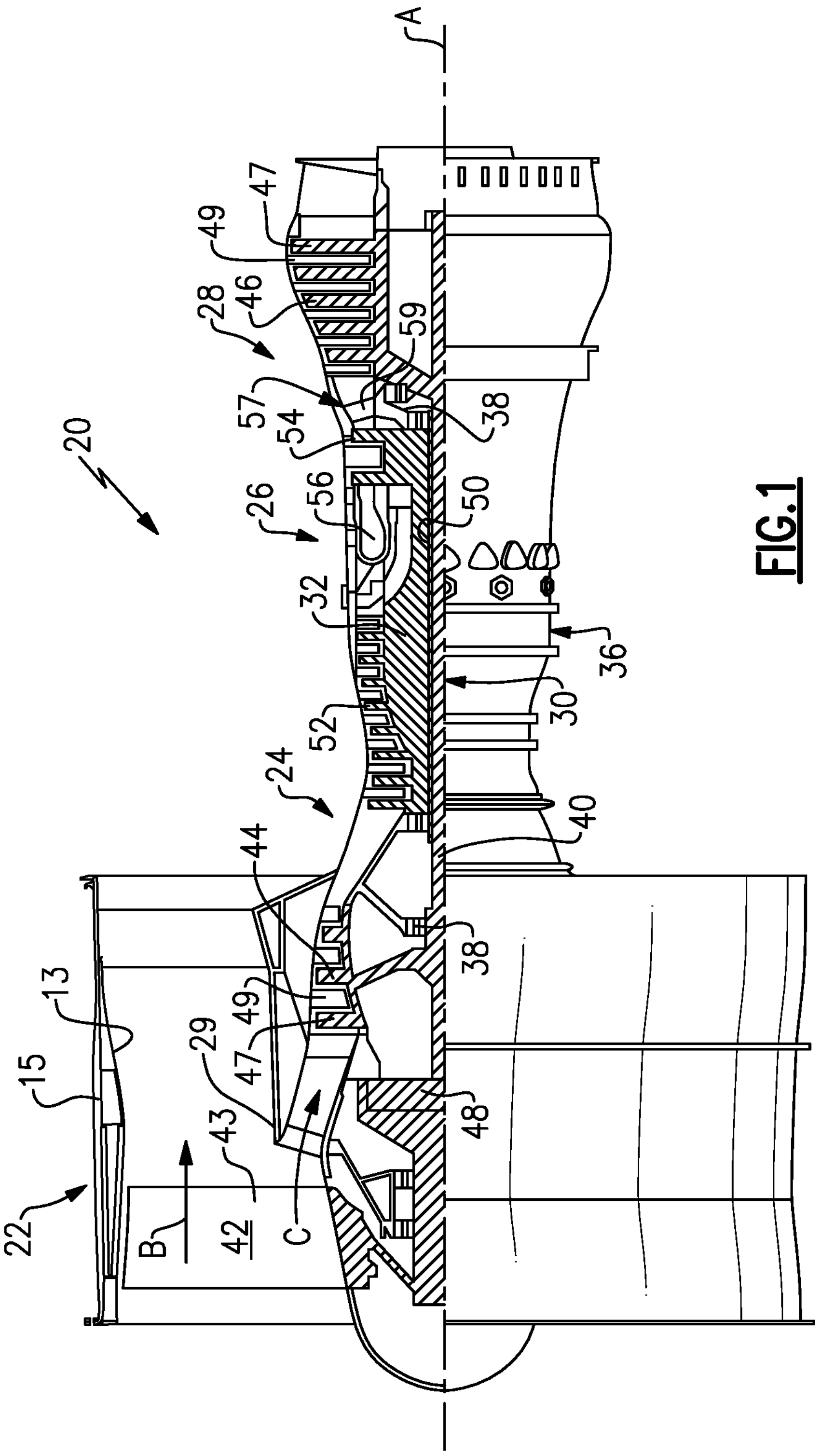
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. It should be understood that the teachings disclosed herein may be utilized with various engine architectures, such as low-bypass turbofan engines, prop fan and/or open rotor engines, turboprops, turbojets, etc. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/see divided by an industry standard temperature correction of $[(\text{Tram } ^\circ \text{R})/(518.7\ ^\circ \text{R})]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

Figure 2:
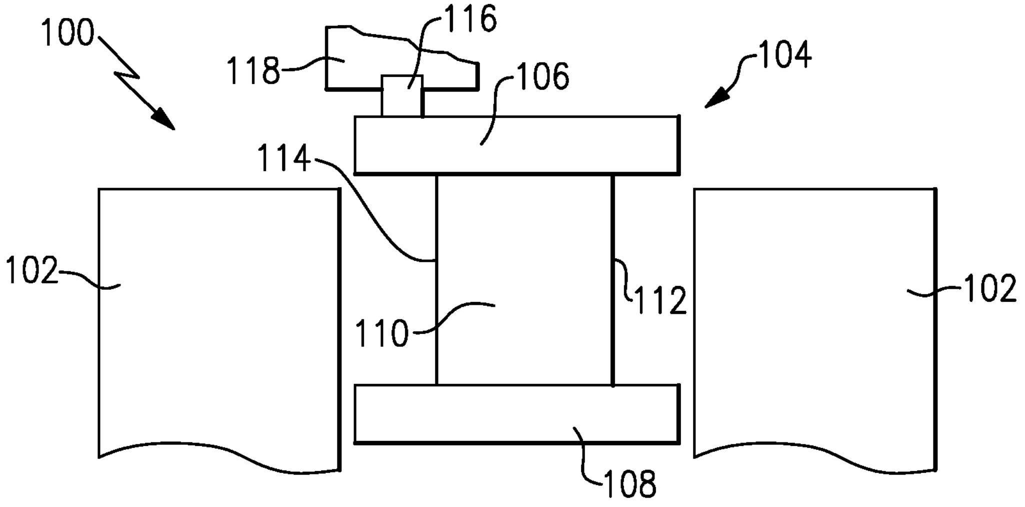
FIG. 2 schematically shows a turbine section.

FIG. 2 schematically shows a turbine section 100 which may be found in the engine of FIG. 1. As shown, rotating turbine blades 102 are separated by a static vane 104. Vane 104 has an outer platform 106 and an inner platform 108. An airfoil 110 connects platforms 106 and 108. Airfoil 110 has a leading edge 114 and a trailing edge 112.

A tab 116 is shown to position the vane 104 relative to static structure 118.

Figure 3:
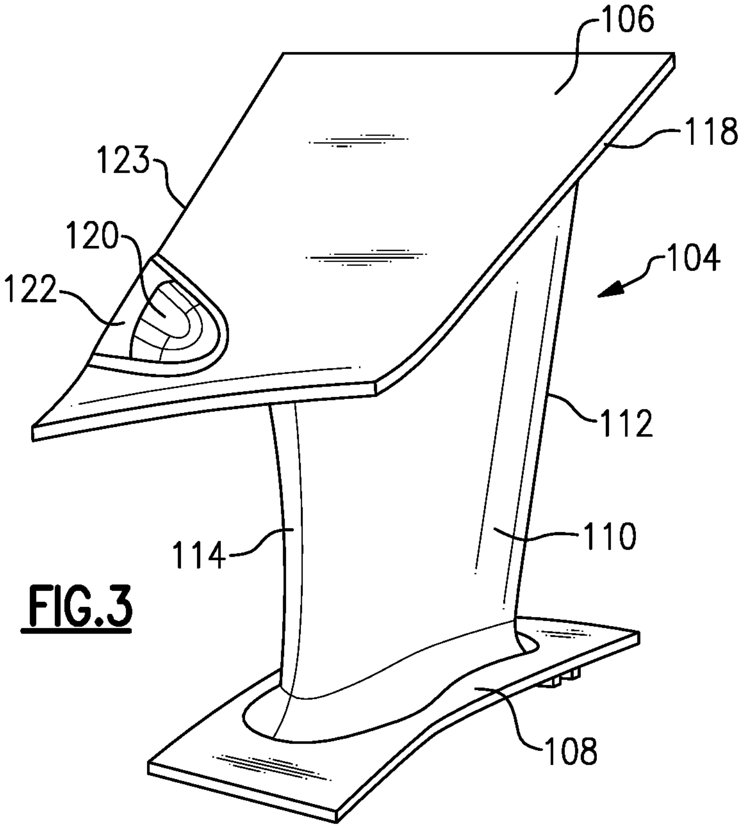
FIG. 3 shows a detail of a turbine vane as disclosed in this application.

FIG. 3 shows a vane 104 according to the teachings of this disclosure. On the outer platform 106 there is an increased thickness portion 120. The increased thickness portion 120 is adjacent to a mount area 122 where the tab 116 will be mounted.

As shown, the thickened portion 120 and the mount area 122 are axially forward of the leading edge 114. Moreover, they are on suction side edge 123 of the outer platform 106. Of course other locations can benefit from this disclosure including the pressure side 118.

Vane 104 is formed of ceramic matrix composites.

A CMC material is comprised of one or more ceramic fiber plies in a ceramic matrix. Example ceramic matrices are silicon-containing ceramic, such as but not limited to, a silicon carbide (SiC) matrix or a silicon nitride (Si3N4) matrix. Example ceramic reinforcement of the CMC are silicon-containing ceramic fibers, such as but not limited to, silicon carbide (SiC) fiber or silicon nitride (Si3N4) fibers. The CMC may be, but is not limited to, a SiC/SiC ceramic matrix composite in which SiC fiber plies are disposed within a SiC matrix. A fiber ply has a fiber architecture, which refers to an ordered arrangement of the fiber tows relative to one another, such as a 2D woven ply or a 3D structure. A monolithic ceramic does not contain fibers or reinforcement and is formed of a single material. Example monolithic ceramics include silicon-containing ceramics, such as silicon carbide (SiC) or silicon nitride (Si3N4).

It is sometimes challenging to form a thickened area such as thickened portion 120 utilizing plies or layers of CMCs.

Figure 4A:
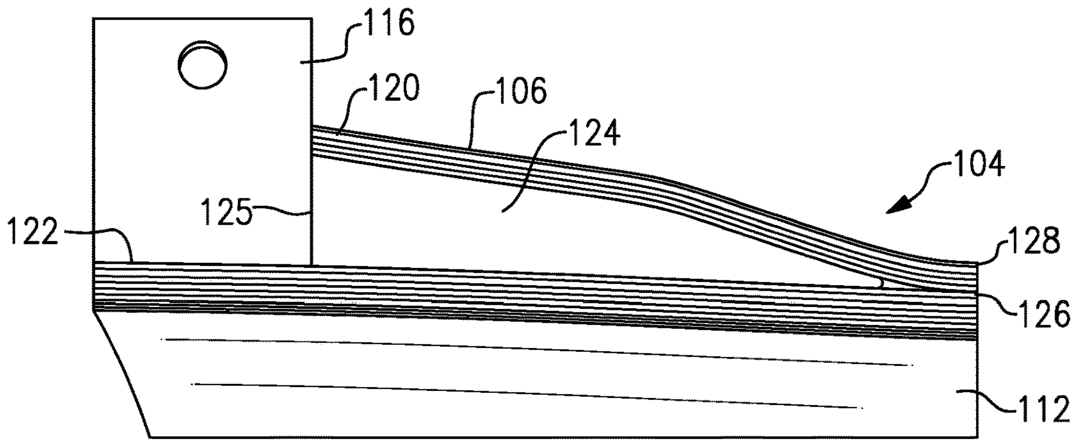
FIG. 4A is a cross-section through a portion of the FIG. 3 vane.

Thus, as shown in FIG. 4A, there is a load bearing insert 124 inserted into the increased thickness portion 120. As shown, there are plies or layers 126 radially inward of the insert 124 and other layers 128 radially outward of the insert 124. An end face 125 of the insert 124 abuts the tab 116. During operation the tab 116 will transmit forces against the end face 125. The thickened portion 120, and in particular the insert 124, provides a good reaction force to resist the mechanical forces applied during operation.

Figure 4B:
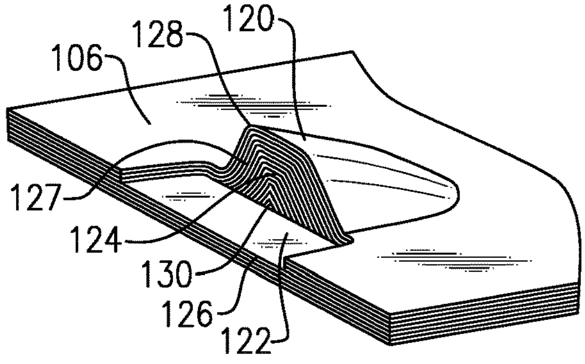
FIG. 4B is a top view of a side of the FIG. 3 vane.

FIG. 4B shows that the insert 124 is also formed of layers 127. Again, one can see the layers 128 and 126 radially outward and radially inward, respectively, the insert 124. Further, the mount 122 adjacent to the thicker portion 120 is shown.

Figure 4C:
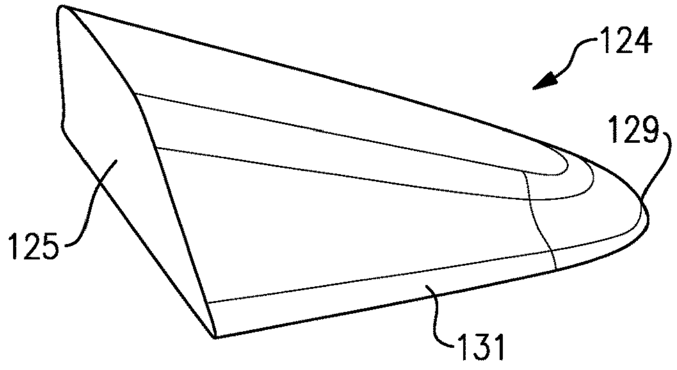
FIG. 4C shows an insert.

FIG. 4C shows the insert 124 having a generally triangular shape with an outward angle from end 129 to reach end face 125.

The insert has tip end 129 remote from the end surface 125, and sides 131 extending outwardly such that the end surface 125 is thicker in a radial direction and a lateral direction than the tip end 129.

Details of an insert as disclosed above may be found in copending U.S. patent application Ser. No. 18/428,856, filed on Jan. 31, 2024, owned by the Applicant of this application, and entitled "LOAD BEARING FEATURE FOR CERAMIC MATRIX COMPOSITE TURBINE COMPONENTS."

Figure 4D:
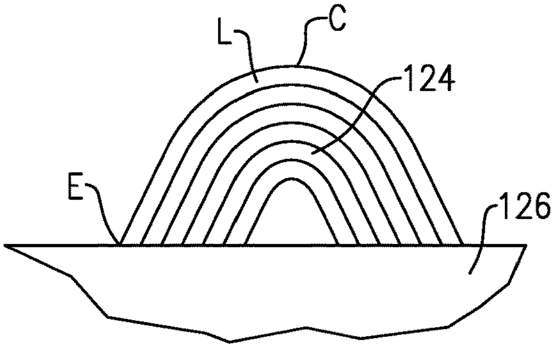
FIG. 4D is a schematic view of the insert.

As shown schematically in FIG. 4D, the insert 124 is formed of a plurality of layers L having an arched central portion C and turned down ends E which form an arch shape relative to the base layers 126. The arch shape provided by the ends extending with at least a component in a direction normal to a plane of the layer 126 provides will better resist the stresses the insert 124 will see during operation.

Figure 5A:
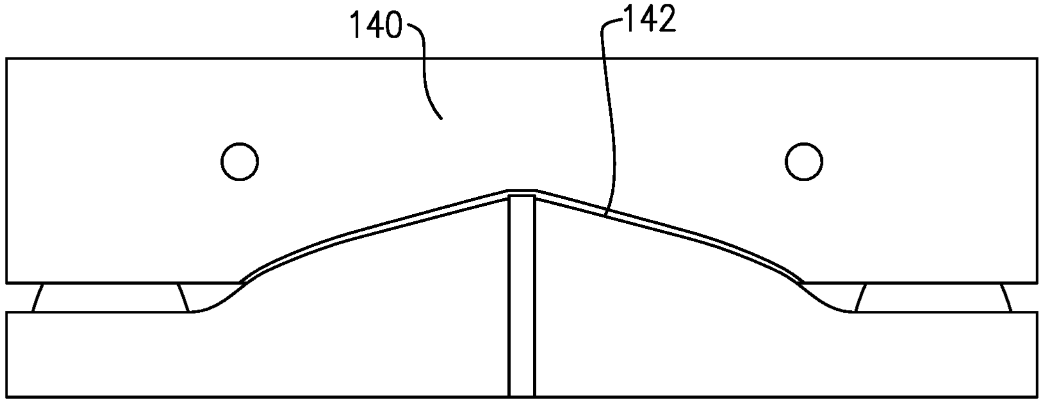
FIG. 5A shows a first step in forming the insert.

FIG. 5A shows a method of forming the insert 124. A compression mold 140 is shown for compressing a layer 142 to a desired shape. A binder may be included.

Figure 5B:
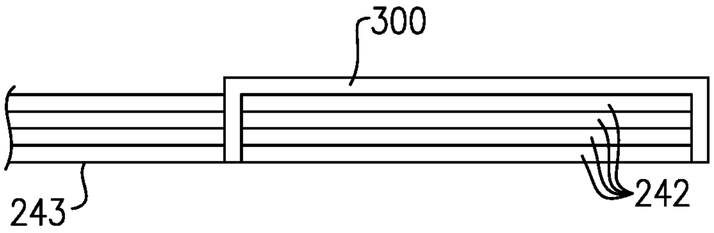
FIG. 5B shows an alternative step to the FIG. 5A step.

As shown in FIG. 5B, schematically, layers 242 are cut by a cutting tool 300 from sheets 243. Since the plural layers are cut together, there is no additional burden on stacking them or assembling them. Rather, the plural layers can be moved to the molding as shown in FIG. 5C.

Figure 5C:
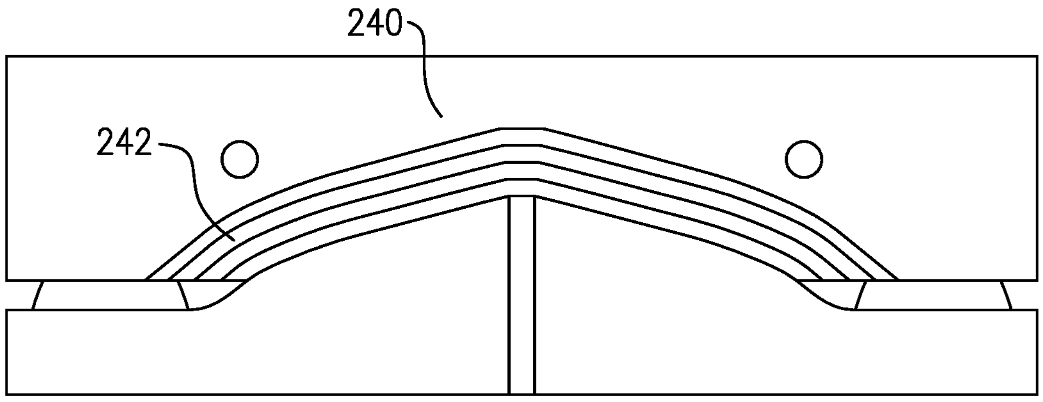
FIG. 5C is a step after the FIG. 5B step.

In embodiments, there may be six subassemblies cut as shown in FIG. 5B and molded as shown in FIG. 5C. Thus, the final insert 124 may have 24 layers. Of course, any other number of layers may be utilized.

FIG. 5C shows a mold 240 method wherein all of plural layers 242 which will be included in the insert are compressed together at one time.

Figure 6A:
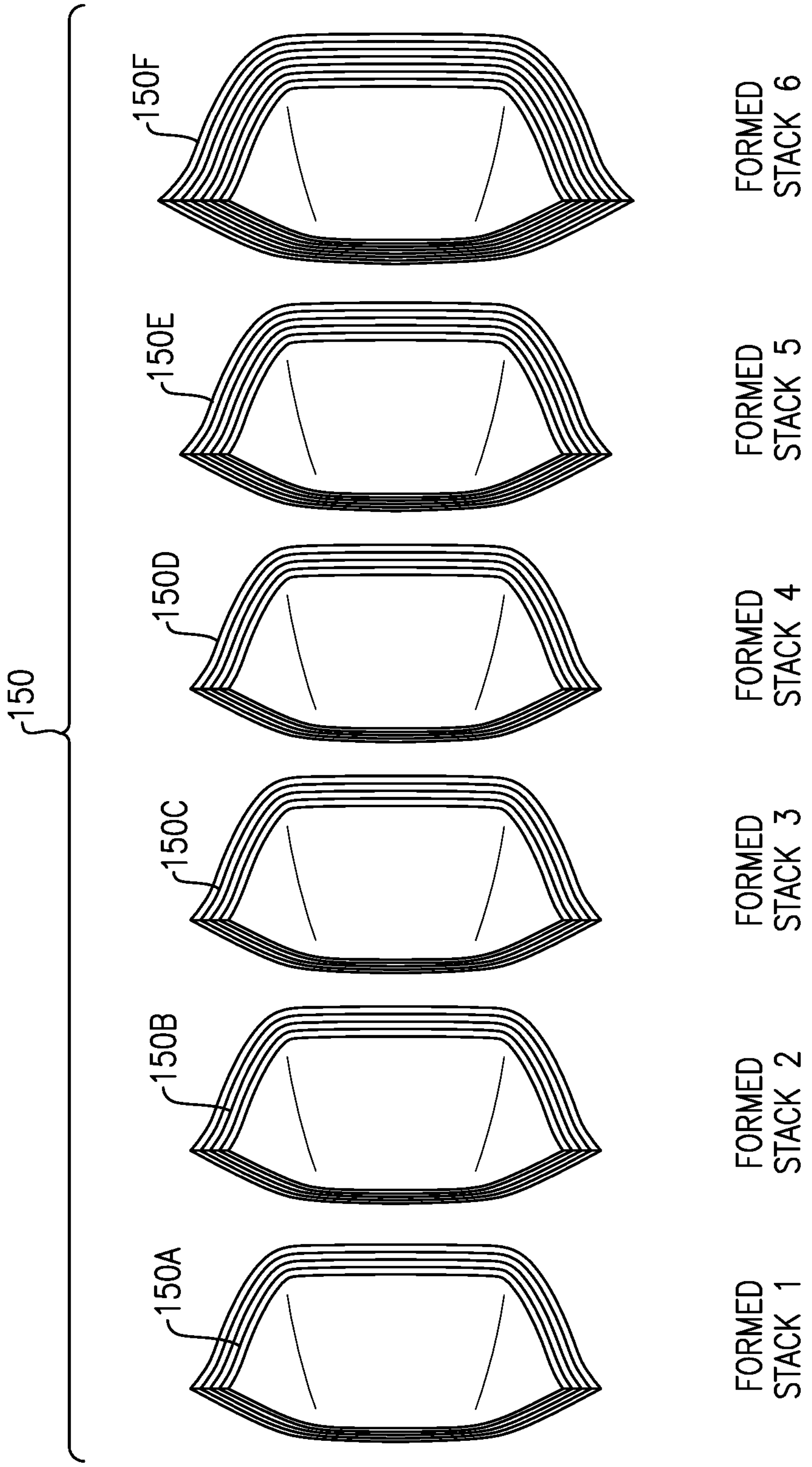
FIG. 6A shows one method of forming an insert step.

FIG. 6A shows that a plurality of increasingly larger stacks 150A, 150B, 150C, 150D, 150E and 150F formed by the compression operation of FIG. 5C come together to form an intermediate insert 150. Of course different molds are used for each of the plurality of stacks. As can be seen, the stacks 150A-150F that go together to form the final intermediate insert 150 are generally cup-shaped. Thus, in the intermediate insert 150 there is a central cup-shaped opening 151.

Figure 6B:
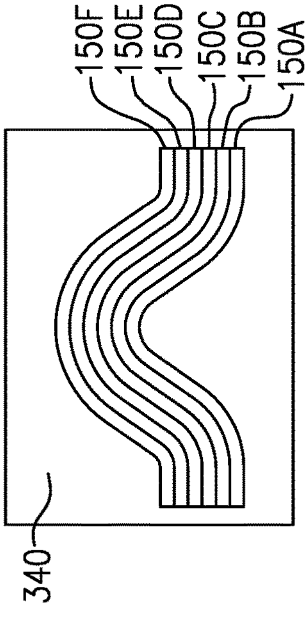
FIG. 6B shows one alternative for moving forward after the FIG. 6A step.

As shown in FIG. 6B, the six cup shaped stacks 150A-150F may be all compressed together within a mold 340 along with the binder to form the intermediate insert member 150.

Figure 6C:
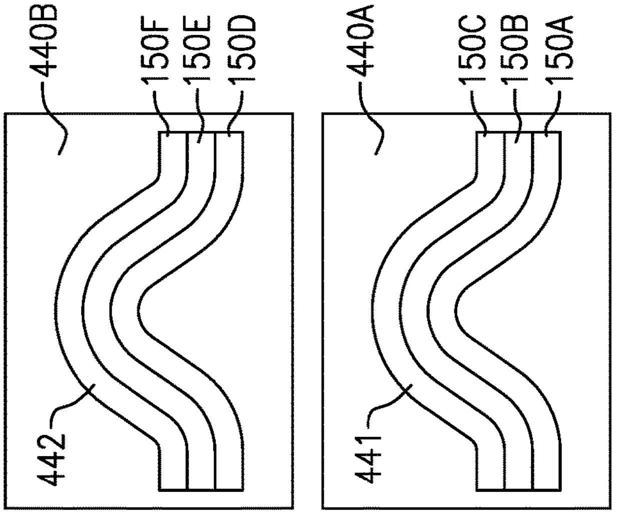
FIG. 6C shows an alternative to the FIG. 6B step.
Figure 6D:
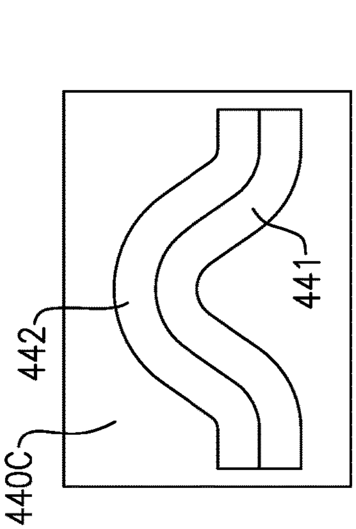
FIG. 6D shows a step after the FIG. 6C step.

FIGS. 6C and 6D show an alternative method. It may be attempting to compress 24 layers as shown in FIG. 6B may prove challenging. Thus, as shown in FIG. 6C, a first subassembly 441 is formed from stacks 150A, 150B and 150C being compressed in a mold 440A along with the binder. Also, a second subassembly 442 is formed from stacks 150D, 150E, 150F in a mold 440B. Then, as shown in FIG. 6D, the subassemblies 441 and 442 are compressed in a mold 440C to form intermediate insert 150.

Figure 6E:
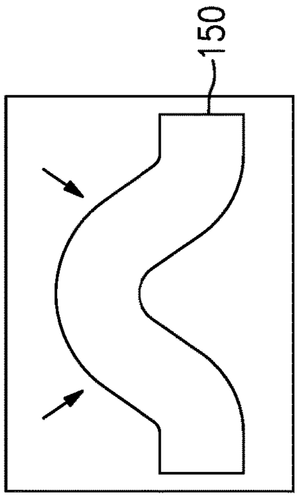
FIG. 6E shows a densification step for any of the embodiments.

FIG. 6E shows an intermediate step wherein the formed intermediate insert 150 is subject to a densification process.

Figure 7:
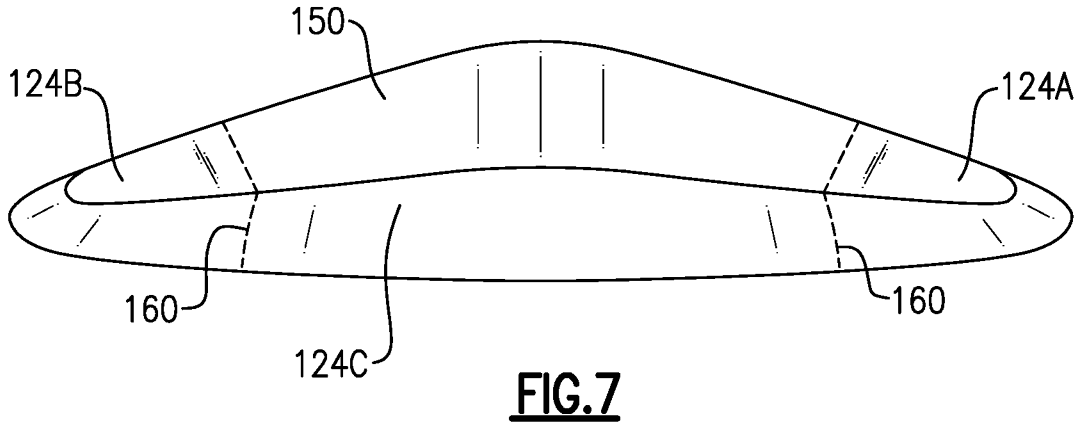
FIG. 7 shows a step in one embodiment of forming the insert.

FIG. 7 shows a subsequent step. Here, the intermediate 150 is cut at 160. This then forms a final insert 124A. Further, from the intermediate insert member 150 a second insert member 124B is formed with a second cut 160. The central section 124C with the cup-shape 151 is then discarded. Cup-shaped opening 151 is not part of insets 124A or 124B.

Forming the intermediate insert 150 and then cutting the first and second insert members 124A and B facilitates the fabrication. The insert members may be too small to be easily handled if formed as single pieces. A worker of skill in this art would recognize by making the intermediate insert member 150 different shapes, greater numbers than 2 could be formed from the intermediate member 150.

Figure 8:
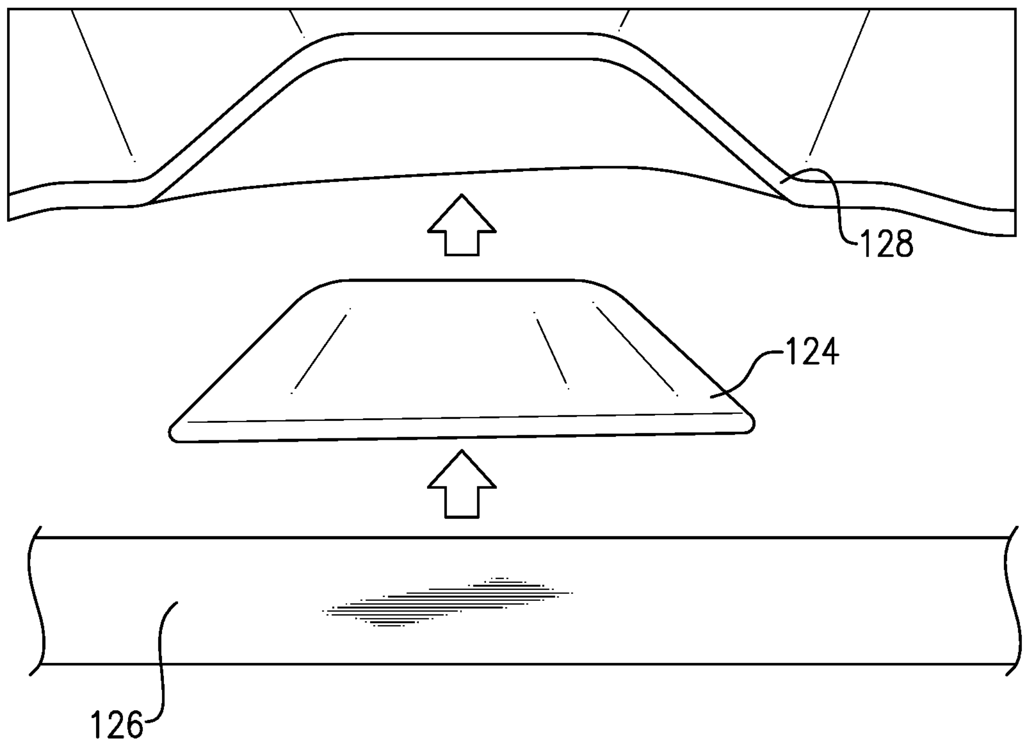
FIG. 8 shows an assembly step.

FIG. 8 shows a method of assembling wherein there is a base layer 126 that receives the insert 124. Outer plies 128 are then secured to the base layer 126 and to the insert 124. The plies 126 and 128 are then densified.

A method of forming a gas turbine engine component under this disclosure could be said to include the steps of forming a component shape from a plurality of layers of ceramic matrix composite. The component has an outer surface. An insert is formed from a plurality of fabric layers of ceramic matrix composites into a cup-shaped intermediate insert member. The intermediate insert member is densified. Then a final insert member is inserted between radially outer layers and radially inner layers on the outer surface. The method then densifies the component.

A gas turbine engine component under this disclosure could be said to include an inner surface and an outer surface. The outer surface and the inner surface are formed of ceramic matrix composite fabric layers, and the outer surface has a mount location and a mount member. The mount member is in contact with an insert that is inserted within outer layers of the outer platform to form a thickened portion having an end surface that will react against forces from the mount member. The insert is formed of a plurality of ceramic matrix composite fabric layers. The ceramic matrix composite fiber layers have an arch-shape such that the fabric layers have ends which are bent relative to a central portion, and such that the ends have at least a component in a direction normal to the direction of the inner surface.

Although embodiments of this disclosure have been disclosed, a worker of ordinary skill in this art would recognize that modifications would come within the scope of this disclosure. For that reason, the following claims should be studied to determine the true scope and content of this disclosure.

What is claimed is:

1. A method of forming a gas turbine engine component comprising the steps of:

forming a vane component shape from a plurality of fabric layers of ceramic matrix composite, the vane component shape having an airfoil, a radially outer platform and a radially inner platform, the radially outer platform formed of radially outward ones of the plurality of fabric layers and the radially inner layers also formed from some of the plurality of fabric layers;

forming an insert from a plurality of insert fabric layers of ceramic matrix composite into an intermediate insert to form a final insert;

densifying the intermediate insert to form a final insert;

then, inserting the final insert between the radially outward ones of the plurality of fabric layers and the radially inner layers that form the outer platform to form a combined vane component; and densifying the combined vane component.

2. The method as set forth in claim 1, further including the step of cutting ends of the intermediate insert away to form at least two of the final inserts after the densifying step.

3. The method as set forth in claim 2, wherein the intermediate insert is formed from a plurality of cup-shaped stacks assemble to form the intermediate insert.

4. The method as set forth in claim 3, wherein the plurality of cup-shaped stacks are each formed of a plurality of the insert fabric layers compressed together.

5. The method as set forth in claim 4, wherein all of the plurality of cup-shaped stacks are compressed together at one time.

6. The method as set forth in claim 4, wherein at least two sub-assemblies of the cup-shaped stacks are compressed together, and then the at least two sub-assemblies of the cup-shaped stacks are then brought together to be compressed together in another compression step.

7. The method as set forth in claim 6, wherein the cup-shaped stacks are each formed of a plurality of the fabric layers.

8. The method as set forth in claim 4, wherein the radially outer layers capture the final insert.

9. The method as set forth in claim 1, wherein the radially outer layers capture the final insert.

10. The method as set forth in claim 1, wherein the plurality of ceramic matrix composite layers forming the intermediate insert are cut at the same time.

11. The method as set forth in claim 10, wherein the final insert has an endface to provide a reaction surface against a mount member.

12. The method as set forth in claim 3, wherein the plurality of layers of ceramic matrix composite forming the cup-shaped stacks are initially planar, but when formed into the cup-shape stacks, the originally planar layers have ends which are bent relative to a central portion to form the cup-shape stacks.

13. The method as set forth in claim 12, wherein the final insert is mounted onto a planar inner surface in the component.

14. The method as set forth in claim 13, wherein the ends of the final insert have fibers extending in a direction which has at least a directional component normal to a planar surface of the inner surface.

* * * * *